(12) United States Patent
Lautenschläger et al.

(10) Patent No.: US 11,325,083 B2
(45) Date of Patent: May 10, 2022

(54) STIRRING APPARATUS AND STIRRING SYSTEM

(71) Applicant: Mikrowellen Labor Technik AG, Heerbrugg (CH)

(72) Inventors: Werner Lautenschläger, Heerbrugg (CH); Jens Lautenschläger, Heerbrugg (CH)

(73) Assignee: MIKROWELLEN LABOR TECHNIK AG, Heerbrugg (CH)

( * ) Notice: Subject to any disclaimer, the term of this patent is extended or adjusted under 35 U.S.C. 154(b) by 539 days.

(21) Appl. No.: 16/184,044

(22) Filed: Nov. 8, 2018

(65) Prior Publication Data

US 2019/0134583 A1 May 9, 2019

(30) Foreign Application Priority Data

Nov. 8, 2017 (DE) ..................... 20 2017 106 756.4

(51) Int. Cl.
*B01F 33/45* (2022.01)
*B01F 33/453* (2022.01)
(Continued)

(52) U.S. Cl.
CPC .......... *B01F 33/4533* (2022.01); *B01F 29/30* (2022.01); *B01F 33/451* (2022.01);
(Continued)

(58) Field of Classification Search
CPC .................................................. B01F 13/0818
(Continued)

(56) References Cited

U.S. PATENT DOCUMENTS

| 622,545 A | * | 4/1899 | Schoknecht et al. | .. A63H 33/26 446/134 |
| 2,859,020 A | * | 11/1958 | Eddy | .................... A47J 43/0465 366/274 |

(Continued)

FOREIGN PATENT DOCUMENTS

DE 38 38 049 A1 5/1989

*Primary Examiner* — David L Sorkin
(74) *Attorney, Agent, or Firm* — The H.T. Than Law Group (57) ABSTRACT

The present invention relates to an apparatus (100) for producing a driving force for stirring samples, in particular samples for laboratory operations such as, for example, liquids, liquids with solid samples contained therein or solid samples, said apparatus comprising a sample holder (200) for receiving at least one sample vessel (220) for samples and a bar element (300), which extends along a longitudinal axis (LA) and which is connected to the sample holder (200), wherein the bar element (300) comprises a coupling portion (310) for detachably coupling the bar element (300) to an operating unit (800), a fastening portion (320) for fastening the sample holder (200) to the bar element (300) and for positioning the sample holder (200) along the longitudinal axis (LA) in defined fashion, and a magnetic stirring portion (330), wherein the bar element (300) is embodied in such a way that a magnetic field that rotates relative to the sample holder (200) about the longitudinal axis (LA) can be produced by means of the magnetic stirring portion (330). The invention further relates to system (700) comprising an operating unit (800) and the apparatus (100) according to the invention, which are detachably coupled by way of the coupling portion (310). The invention further relates to a process for stirring samples in sample vessels by means of the system (700).

27 Claims, 3 Drawing Sheets

(51) Int. Cl.
*G01N 1/38* (2006.01)
*B01F 29/30* (2022.01)
*B01F 33/451* (2022.01)
*B01F 33/452* (2022.01)
*B01F 35/90* (2022.01)
*B01L 7/00* (2006.01)
*B01L 9/06* (2006.01)

(52) U.S. Cl.
CPC ............ *B01F 33/452* (2022.01); *G01N 1/38* (2013.01); *B01F 35/90* (2022.01); *B01F 2035/99* (2022.01); *B01L 7/52* (2013.01); *B01L 9/06* (2013.01); *G01N 2001/386* (2013.01)

(58) Field of Classification Search
USPC .................................................. 366/273, 274
See application file for complete search history.

(56) References Cited

U.S. PATENT DOCUMENTS

| | | | | |
|---|---|---|---|---|
| 3,356,346 | A * | 12/1967 | Landsberger | B01F 13/0818 366/274 |
| 5,272,092 | A * | 12/1993 | Hamasaki | B01F 11/0005 366/116 |
| 6,905,656 | B1 | 6/2005 | Ladlow et al. | |
| 7,211,430 | B2 * | 5/2007 | Schwarz | B01F 13/0818 366/273 |
| 2003/0031089 | A1 * | 2/2003 | Schwarz | B01L 9/523 366/273 |
| 2006/0133194 | A1 * | 6/2006 | Takahashi | H02K 44/06 366/147 |
| 2011/0226608 | A1 | 9/2011 | Lautenschlaeger | |

* cited by examiner

STIRRING APPARATUS AND STIRRING SYSTEM

The present invention relates to an apparatus for producing a driving force for stirring samples in a sample vessel, a system comprising such an apparatus and an operating appliance, and a process for stirring samples in sample vessels by means of the aforementioned system.

The prior art, e.g., DE 10 2010 030 287, has disclosed pressure vessels in which a liquid sample in the interior of the pressure vessel is heated by means of microwave radiation. A mechanical stirrer is provided in the aforementioned pressure vessel, said stirrer protruding into the liquid sample in order to mix the latter for the purposes of setting a uniform temperature.

However, such a pressure vessel is limited in terms of the breadth of laboratory applications. Thus, the number of different samples that can be stirred simultaneously in the pressure vessel is limited since only a single receiving vessel—the vessel—and a single stirrer are provided in the pressure vessel. Further, the case may occur where the provided capacity of the pressure vessel is over-dimensioned in comparison with the volume of the sample to be stirred. This is the case, in particular, if only a small amount of sample liquid is intended to be stirred in the pressure vessel. A risk arising in this case is that the stirrer does not protrude far enough into the sample, as a result of which it is no longer possible to stir the sample.

Further, the prior art has also disclosed apparatuses with a pressure vessel and integrated magnetic stirrer. A magnetic stirrer is an electrical appliance with a plate, under which a magnet that is provided in an integrated fashion rotates with a controllable speed. The magnetic stirrer is fixedly provided in the apparatus below the pressure vessel or it is arranged an integrated fashion in a base region of the pressure vessel order to drive a usually bar-shaped magnet in the interior of sample-containing sample vessels in the pressure vessel for the purposes of stirring the sample. However, in laboratory routine, such an integrated construction was found to be disadvantageous, in particular, if stirring of the sample is not in fact necessary.

Particularly in the case of experimental laboratory operation in research and development, however, there is the need to cover as many experimental use cases as possible by the provision of a single apparatus. This reaches from processing relatively small amounts of sample to producing relatively large volumes. Further, the goal is not to increase the spatial requirements of such an apparatus despite the provision of an increased functionality.

Consequently, it is an object of the present invention to provide an apparatus, a process and a system which can be used to stir a multiplicity of different samples at the same time. Further, it should be possible to put samples with different volumes into a stirring motion at the same time. Moreover, the invention should facilitate simple handling and manipulating of the samples at any time of the stirring procedure, i.e., before, during and after stirring. The installation space of existing stirring apparatuses that is already available should be exploited as optimally as possible in the process.

This object is achieved by the subject matter of the independent claims. The dependent claims develop the central concept of the present invention in a particularly advantageous manner.

A first aspect of the present invention relates to an apparatus for producing a driving force for stirring samples, in particular samples for laboratory operations. Here, all stirrable types of sample come into question as a "sample". Purely by way of example, reference is made here to liquids, liquids with solid samples contained therein or solid samples (for example mixtures, e.g., in powder form) for laboratory operations. Here, matter in its liquid or a flowable state of matter is referred to as a "liquid". Further, "stirring" or a "stirring procedure" is understood to mean any agitation of the constituents of the sample in order to obtain a distribution of the constituents that is as homogeneous as possible, in particular by mixing. By way of example, this can be obtained by agitating the constituents of the sample to carry out a substantially circular or circling movement.

The apparatus comprises a sample holder for receiving at least one sample vessel for samples. According to the invention, a sample vessel is understood here to mean a receptacle or container, for example a test tube, that is suitable for receiving the sample and suitable for the chemical process to be carried out. The sample holder renders it possible to hold the sample vessel in its position in suitable fashion, preferably in a substantially erect position with an opening that points upward.

Moreover, the apparatus has a bar element, which extends along a longitudinal axis and which is connected to the sample holder. According to the invention, a "bar element" is understood here to mean an elongate element whose longitudinal extent is formed substantially along an axis (longitudinal axis) and which preferably has a symmetrical embodiment, e.g., substantially round embodiment, in cross section.

The bar element comprises a coupling portion for detachably coupling the bar element to an operating unit. By way of example, the coupling portion can be embodied for mechanical and/or magnetic coupling. According to the invention, any appliance or any apparatus that can be used to operate the apparatus in such a way that a driving force for stirring samples is produced by means of the apparatus is understood to be an operating unit.

Further, the bar element comprises a fastening portion. Here, the fastening portion is provided to fasten the sample holder to the bar element in order thus to position the sample holder in defined fashion along the longitudinal axis of the bar element—i.e., axially.

Further, the bar element comprises a magnetic stirring portion. Here, the bar element is embodied in such a way that a magnetic field that rotates relative to the sample holder about the longitudinal axis can be produced by means of the magnetic stirring portion. According to the invention, a "rotating magnetic field" is understood to mean a magnetic field whose poles run through a movement that substantially circles about an axis of rotation. Expressed differently: using such an apparatus, it is possible to locally measure a time-varying magnetic field (e.g., a sinusoidal magnetic field), the time curve of which is describable as a function of a rotation of the bar element in relation to the sample holder.

Consequently, the apparatus renders it possible to produce changes in the orientation and strength of the magnetic field over time at one location in the region around the magnetic stirring portion; more specifically constantly changing poles can be provided over time (e.g., with a sinusoidal curve) at one location. As a result, a force required for stirring can be provided by means of a time-varying magnetic field. Since the sample holder is connected to the bar element, this magnetic field is provided at the same time in relative proximity to the sample holder and can therefore also be used for the sample vessel. Here, the provision of the necessary force for the stirring procedure is implemented by way of an interaction with the magnetic field and consequently it is implemented in contactless fashion. Consequently, no structures for a force transmission have to be provided between the magnetic stirring portion and the individual sample vessels. In this way, it is possible to provide a driving force that, as will be described below, can be used for stirring where necessary as a result of an interaction with further parts. Provided no stirring is desired, or no stirring is desired only temporarily, it is possible to dispense with these further parts as desired. Consequently, the invention provides, in particular, the provision of the driving force and consequently the possibility for using the same.

According to a preferred development of the apparatus, the sample holder is detachably connected to the bar element. Here, a "detachable connection" is understood, in particular, to mean a connection in which the corresponding components can be released again as often as desired in non-destructive fashion. As a result, it is possible to firstly insert the sample vessel into the sample holder and subsequently to connect this to the bar element, or vice versa. This leads, in particular, to relief when carrying out routine laboratory activities, such as, for example, the preparation and the insertion of sample vessels. Moreover, the individual components can easily be cleaned after use or can easily be replaced should defects occur. Further, the bar element can be combined with different sample holders, for example for receiving a different number of sample vessels and/or differently designed sample vessels.

In an advantageous configuration of the invention, the sample holder is connected to the bar element in coaxial fashion. Here, according to the invention, a "coaxial connection" is understood to mean a connection in which the two components are aligned to one another in respect of an own body axis, wherein both components are preferably connected centrally to one another in view of the selected body axis. This renders it possible to use the rotating magnetic field as uniformly as possible at each location of the sample holder.

Preferably, the sample holder has a point-symmetric or cyclically symmetric embodiment as seen in the direction of the longitudinal axis. Here, the sample holder can have defined receiving regions for receiving the sample vessels. In the connected state of bar element and sample holder, the receiving regions are preferably arranged distributed about the longitudinal axis, particularly preferably with a uniform distribution. Such a structure can optimize the installation space for the apparatus.

In particular, the fastening portion can be embodied in such a way that the bar element is mounted to be rotatable relative to the sample holder about the longitudinal axis. According to the invention, a "rotatable mount" is understood to mean a mount which allows at least one rotational movement about an axis—in this case about the longitudinal axis. Consequently, it is conceivable that the rotational mount also admits and facilitates further freedoms of movement, such as, for example, an axial movement. Consequently, the bar element can be rotated about its longitudinal axis and with respect to the sample holder by means of such a mount. A radial mount is preferred.

Further, the fastening portion can be formed by a stepped portion of the bar element, wherein the sample holder lies in axial fashion on a radial step of the stepped portion and said sample holder is preferably mounted in rotatable fashion. Such an arrangement allows the sample holder to be set in one direction along the longitudinal axis with respect to the bar element. At the same time, the rotatability of the rotating element in relation to the sample holder is maintained. As a result, the sample holder can be detachably fastened to, and rotatably mounted on, the rotating element using simple constructive means.

The magnetic stirring portion can be formed by an electric magnet. According to this configuration, it is possible to cause the rotating magnetic field either by a rotation of the magnetic field by appropriate control of the current flow in coils, with the bar element not needing to be rotated in this case. Consequently, avoiding a relative movement between the two components can be achieved and it is consequently possible to achieve a significantly reduced wear of the components. At the same time, the actuation of the coils can be brought about by a simple electronic circuit.

As an alternative or in addition thereto, the stirring portion can also be formed by a (permanent) magnet, in particular a bar magnet or a rotary magnet having two magnetic poles, wherein the magnetic poles preferably extend radially opposite one another with respect to the longitudinal axis. In this case, the rotating magnetic field can be produced by a relative rotation of the magnetic stirring portion, e.g., of a two-pole magnet of same, in relation to the sample holder or the sample vessels, for example by a rotation of the bar element. This allows a combination of existing stirring systems having a mechanical drive system with such an advantageous apparatus. By rotating the bar element with respect to the sample holder, the magnetic stirring portion can preferably be provided as a rotary magnet in order to produce the rotating magnetic field.

Preferably, the magnetic stirring portion extends at least partly radially within or outside of the sample holder or at least partly axially below the sample holder. Since the strength of the magnetic field decreases with increasing distance, the magnetic field occurs in the particularly advantageous region around the sample holder and within the sample holder as a result of such an arrangement, and so a driving force can be made available at a suitable location.

Moreover, the bar element can have a mechanical stirring portion, which extends radially with respect to the longitudinal axis, wherein the mechanical stirring portion is preferably formed by the magnetic stirring portion. Consequently, it is possible also to provide a mechanical driving force in addition to a magnetic driving force for the stirring procedure. This is particularly advantageous in the case of a bar element that rotates about the longitudinal axis, said bar element also providing the drive of the mechanical stirring portion at the same time. By embodying the magnetic stirring portion in the form of a mechanical stirring portion at the same time, it is possible to provide an integrally provided two-fold stirring function with this bar portion.

The coupling portion preferably has a coupling partner of a mechanical and/or magnetic coupling to an operating unit. According to the invention, a "coupling partner" is understood here to mean a piece or counterpiece of a coupling between two components. Such a configuration provides a simple connection option for the bar element to an operating unit. By way of example, mechanical coupling can be provided by way of a screw-in or bayonet connection.

In a preferred configuration of the invention, the coupling portion, the fastening portion and the magnetic stirring portion are arranged in this sequence along the longitudinal axis of the bar element. Particularly preferably, the respective portions directly adjoin one another. The three aforementioned portions of the bar element can preferably have an integral embodiment with one another in the above-described sequence or else in any other sequence. What such an arrangement or embodiment can achieve is that the bar element is easy to manufacture and can be connected to other agitators, since many mechanical stirring bars have at their ends an option for a connection to a drive unit and have at their other end a propeller-like stirring element for stirring purposes.

According to an advantageous development of the invention, the apparatus moreover can comprise a vessel with a receiving space for receiving the sample holder (including sample vessels). Consequently, it is possible to process a further sample (e.g., a liquid) in the receiving space of the vessel in addition to the samples in the sample vessels of the sample holder. Preferably, the vessel has a coupling opening for coupling microwaves into the receiving space. For heating purposes, it may also be conceivable, in principle, to make use of a heating rod which protrudes into the receiving space. Consequently, a heating function for heating the samples is provided. Further, the apparatus according to the invention can comprise a lid for sealing the receiving space, preferably for sealing the latter in pressure-tight fashion. Consequently, a pressurized reaction can be carried out using the apparatus. The provision of a closed receiving space in this case ensures a protection from the samples to the outside.

The sample holder can be rotationally fixed with respect to the longitudinal axis or said sample holder can be embodied in such a way that it rotates with respect to the longitudinal axis at a different speed to, and preferably slower than, the rotating magnetic field, particularly preferably than the rotating rotary magnet. Consequently, this allows a rotating magnetic field to act effectively on the sample holder or the sample vessels. Further, the apparatus according to the invention can comprise a blocking part, which interacts with a blocking region of the sample holder so as to rotationally fix the sample holder with respect to the longitudinal axis. The blocking region can preferably be configured as a blocking structure that, at least as seen in the circumferential direction about the longitudinal axis or axis of rotation, interacts with the blocking part, in particular in interlocking fashion. If a vessel is provided, the latter can preferably be embodied together with the blocking part. Then, the vessel particularly preferably has an integral embodiment with the blocking part. Consequently, the provision of the blocking part renders it possible to prevent twisting or dragging of the sample holder in the case where the bar element is rotated about its longitudinal axis for the purposes of producing a rotating magnetic field relative to the sample holder. Further, it is possible to set the position of the sample holder with respect to the vessel.

Further, the apparatus according to the invention can comprise at least one sample vessel, in which a stirring element, preferably a magnetic stirring element and particularly preferably a stirrer bar, is arranged, said stirring element being able to be put into rotation by means of the rotating magnetic field of the magnetic stirring portion. Here, according to the invention, a "stirring element" is understood to be an element that can be used to transfer a stirring movement onto the sample. Here, a "stirrer bar" is a usually bar-shaped magnet, which is often clad with a plastic such as PTFE or glass in order to achieve low friction and provide the latter in chemically inert fashion. Preferably, the stirring element is embodied in such a way that it carries out a stirring movement as a result of excitation by the rotating magnetic field. Thus, if a magnetic stirring element—such as a stirrer bar—is used, the forces arising at the poles of the magnetic stirring element by the rotating magnetic field can be employed to prompt the stirring element to carry out a rotational movement. Since the change in the magnetic field is effective over the entire region over which the magnetic stirring portion passes, it is consequently also possible to provide a driving force for stirring a multiplicity of sample vessels.

Further, a system is provided according to a further aspect of the invention, said system comprising an operating unit and an apparatus according to the invention of the above-described type. Here, the apparatus is detachably coupled to the operating unit via the coupling portion. Preferably, the lid—should it be present—can be formed together with the operating unit. Hence, an operational unit for implementing the stirring procedure can be provided by the system according to the invention. The detachability of the coupling between the operating unit and the apparatus simplifies the transportability of the apparatus, and servicing and replacement of the corresponding assemblies. It is likewise possible to provide a kit of apparatuses, which can be coupled to the operating unit, as a result of which the range of use of the system according to the invention is increased and the latter can be adapted to the individual requirements caused, for example, by the samples to be treated.

According to an advantageous development, the system further comprises a thermal sensor for capturing the temperature in the sample vessels or in the vessel. Preferably, the thermal sensor has an elongate, bar-shaped form. Preferably, the blocking part is formed by the thermal sensor by virtue of the latter, when viewed in the circumferential direction about the longitudinal axis, forming an interlocking connection with a recess of the sample carrier forming the blocking region. Here, the thermal sensor can preferably protrude into the vessel and can be further preferably connected to the lid.

The thermal sensor facilitates controlled heating of the sample in the vessel and in the sample vessels. This is particularly advantageous if the samples should follow specific temperature curves or if certain temperatures must not be overshot or undershot. Further, the blocking function can be provided in a particularly advantageous manner using the presented construction since no further structures at the vessel wall or further components have to be provided.

Further, a drive unit can be provided in the system, by means of which drive unit the lid is movable relative to the vessel in partly or fully automated fashion in order thus to selectively open the vessel or seal the latter with the lid. This renders it possible to execute handling, operation and monitoring of the system in an automated manner. By way of example, this is advantageous if the samples should be automatically lifted out of the vessel for cooling purposes after running through appropriate process curves in the pressure vessel such that the system can also be used in absence of laboratory staff.

Further, the system may comprise a heating apparatus such as a heating rod or magnetron for heating the samples. The former can be embodied together with the lid in order to extend into the vessel. The latter can be provided in such a way as to introduce microwaves into the receiving space via the coupling opening.

The system may further comprise a control unit which controls the operating unit and further, preferably, controls the drive unit and the heating apparatus.

A third aspect of the present invention relates to a process for stirring samples in sample vessels, in particular samples for laboratory operations such as, for example, liquids, liquids with solid samples contained therein or solid samples. The process includes at least the following steps:

providing a system according to the invention, inserting at least one (or more) sample vessel(s) comprising a sample into the sample holder, wherein a stirring element is arranged in at least one of the sample vessels, and producing a magnetic field rotating relative to the sample holder about the longitudinal axis by means of the magnetic stirring portion in order to put the stirring element(s) in the sample vessel(s) into rotation.

Further, the apparatus (or at least the sample holder) can be received in the receiving space of the vessel before the rotating magnetic field is produced. Here, the receiving space is preferably sealed by means of the lid, preferably in pressure-tight fashion. This is implemented by means of the drive unit, for example.

According to an advantageous configuration, the bar element is rotated relative to the sample holder about the longitudinal axis. Moreover, at the same time, the sample holder can be rotationally fixed with respect to the longitudinal axis in this case by means of the blocking region. Moreover, further, a loading liquid can be filled—preferably before receiving the apparatus in the receiving space—into the vessel, the sample vessels at least partly protruding into said loading liquid. Here, preferably, the mechanical stirring portion is arranged in the loading liquid such that the loading liquid is stirred in the case of a rotation of the bar element about the longitudinal axis.

The sample can be heated before, after and/or during the stirring procedure by means of the heating apparatus.

The method can be implemented in partly or fully automatic fashion. To this end, use can be made of the control unit.

Further configurations and advantages of the present invention are explained on the basis of the following exemplary embodiments in conjunction with the figures of the attached drawings. In the figures.

Figure 1:
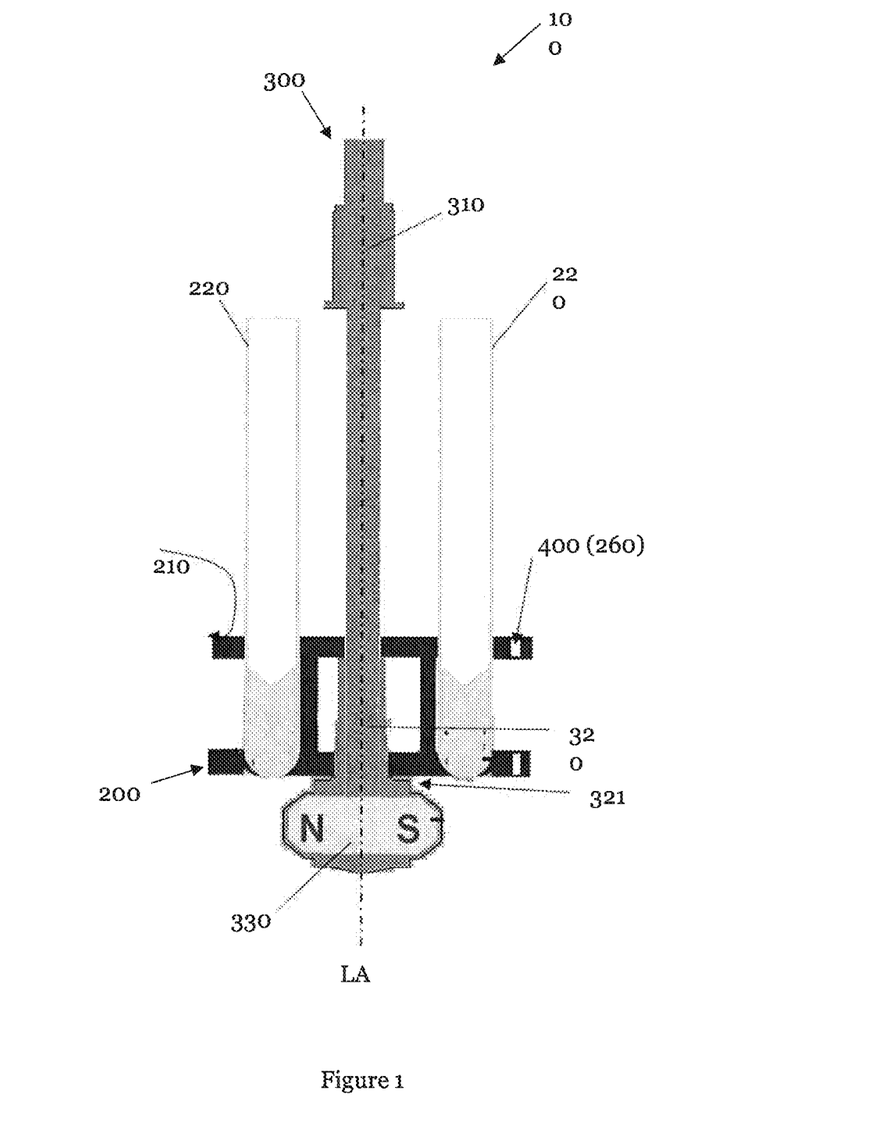
FIG. 1 shows a schematic cross-sectional illustration of an apparatus according to the invention.
Figure 2:
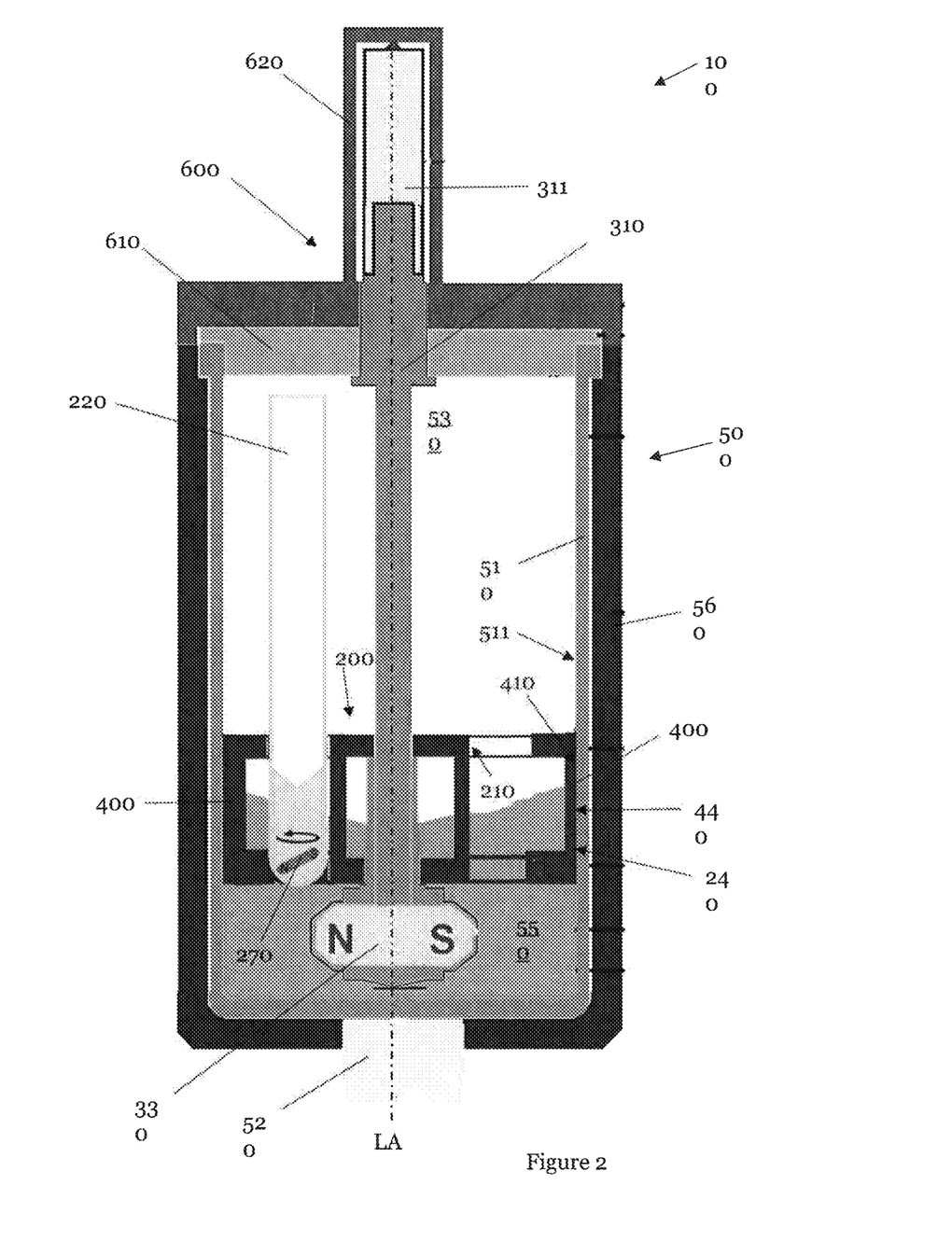
FIG. 2 shows a schematic cross-sectional illustration of a development of the apparatus according to FIG. 1.
Figure 3:
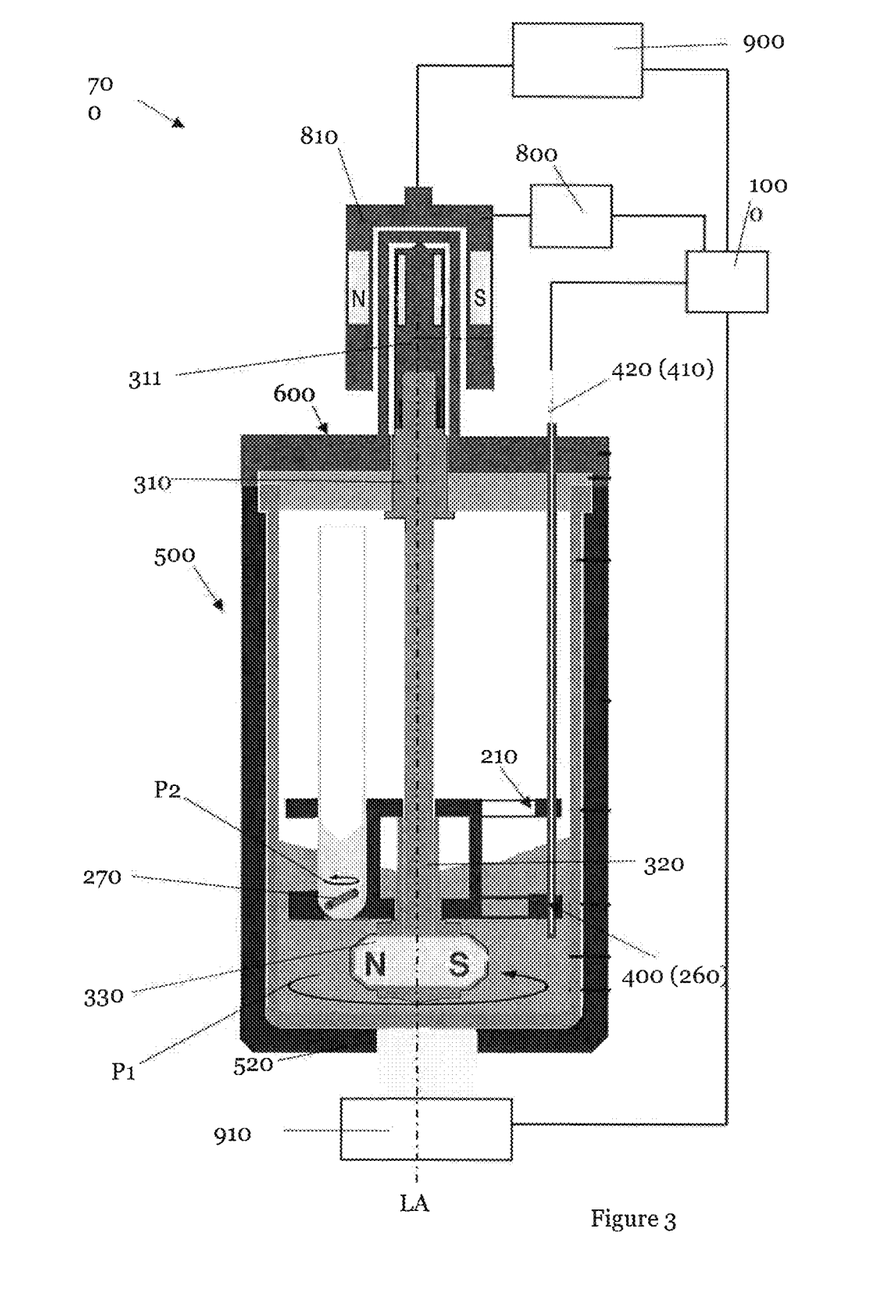
FIG. 3 shows a schematic cross-sectional illustration of a system according to the invention, comprising the apparatus from FIG. 2.

FIGS. 1 and 2 show different exemplary embodiments of an apparatus 100 for producing a driving force for stirring samples, in particular samples for laboratory operations, according to the invention. Further, FIG. 3 shows a system 700 according to the invention for providing a driving force for stirring and for stirring liquids with the apparatus 100 illustrated in FIG. 2.

The samples used for the subject matter of the invention can be any type of substance or substance mixture that is stirrable. These may be in any state of matter or else be composed of constituents in the same state of matter or in different states of matter. Thus, the sample can be a liquid, for example. By way of example, liquids can be substances or substance mixtures (solutions, emulsions) with a low viscosity that are flowable in any case—possibly at certain temperatures produced by the system 700. Liquids or liquid mixtures with solids contained therein, such as, e.g., solutions (e.g., a saline solution) or suspensions, also fall in the range of application of the apparatus 100. However, the use of gels or gel-like substances, up to substances with a high viscosity, is also conceivable for as long as these are stirrable. Likewise, all other homogeneous or heterogeneous substance mixtures that are stirrable are conceivable in addition to solutions. In addition to the aforementioned solutions (e.g., consisting of liquid+liquid, liquid+solid, liquid+gas), these likewise include suspensions (solid+liquid), emulsions (liquid+liquid), aerosols (liquid+gas) and foam (gas+liquid). However, the invention is not restricted thereto.

FIG. 1 shows an apparatus 100 according to the invention in a simplified form. Here, the apparatus 100 has a sample holder 200 for receiving at least one sample vessel for samples 220. The sample holder 200 preferably has defined receiving regions 210 for receiving the sample vessels 220. By way of example, suitable sample vessels 220 can be beakers and test tubes, conical flasks or Petri dishes, which are typically used in laboratories, with this list not being exhaustive. Additionally, the use of receptacles that are not usually used in laboratory operation but that are particularly well suited to receive or convert a sample as sample vessels 220 is also conceivable. By way of example, glass, porcelain or fluorinated plastics, such as, e.g., PTFE or PVFD, find use as materials for the sample vessels 220. Here, the apparatus 100 preferably has at least one such sample vessel 220.

Further, the apparatus 100 has a bar element 300, which extends along a longitudinal axis LA and which is connected to the sample holder 200. In each case, the longitudinal axis LA is indicated by a dashed line in FIGS. 1 to 3.

As illustrated in the figures, the receiving regions 210 of the sample holder 200 are preferably distributed around the longitudinal axis LA, preferably with a uniform distribution, in the connected state of bar element 300 and specimen holder 200. Moreover, as seen in the direction of the longitudinal axis LA, the sample holder 200 can have a point-symmetrical or cyclically symmetrical embodiment. In FIGS. 1 to 3, the receiving regions 210 are illustrated as openings in the sample holder 200 in each case, it being possible to insert the sample vessels 220 into said openings. In the figures, the sample vessels 220 are illustrated by test tubes in an exemplary manner and the sample holder 200 is illustrated as a cage structure in an exemplary manner. However, alternatively, the sample holder 200 can be formed by other components as well, such as, for example, a retort-stand rod with a clamping apparatus (not illustrated), as typically finds use in a laboratory. By way of example, glass, porcelain or plastics, and also metals and wood, can be used as material for the sample holder 200. However, the material of the sample holder 200 preferably does not absorb any microwave radiation.

As seen in the direction of the longitudinal axis LA, the bar element 300 preferably has a substantially round cross section. Moreover, the bar element 300 is preferably manufactured from a heat-resistant and chemically inert material; however, the bar element 300 also may merely be coated or covered with such a material.

Further, the bar element 300 has a fastening portion 320, by means of which the sample holder 200 is fastened, preferably detachably fastened, to the bar element 300 in a defined position along the longitudinal axis LA. Here, the fastening portion 320 can be embodied in such a way that the bar element 300 is mounted to be rotatable relative to the sample holder 200 about the longitudinal axis LA. By way of example, such a mount can be obtained by virtue of a friction bearing or pivot bearing being provided between the sample holder 200 and the bar element 300. However, it is also conceivable for the fastening portion 320 to be formed directly by way of a stepped portion 321 of the bar element 300. By way of example, this is illustrated in FIGS. 1 to 3. Here, the sample holder 200 lies axially on a radial step of the stepped portion 321 and it is mounted in rotatable fashion in relation to the bar element 300 at the same time. Moreover, the rotatable mount is preferably assisted by a radial mount of the sample holder 200 with respect to an axial region of the fastening portion 320. Alternatively, bringing about a complete axial fixation of the sample holder 200 on the bar element 300 along the longitudinal axis LA by means of constructional means and consequently only permitting the rotatability of the two components about the longitudinal axis LA is also conceivable. The bar element 300 is preferably detachably connected to the sample holder 200. Here, in particular, an interlocking connection between the sample holder 200 and the bar element 300 is preferred in order to simplify the operation and activation of the apparatus 100.

Furthermore, the sample holder 200 can be connected to the bar element 300 in coaxial fashion. This is illustrated in an exemplary manner in FIGS. 1 to 3. What becomes clear here, in particular, is that the longitudinal axis of the body of the sample holder 200 is not only aligned along the longitudinal axis LA but also lies substantially flush with the latter. Consequently, the assembly of the sample holder 200 and bar element 300 has a common axis (of rotation), which is formed by the longitudinal axis LA. In principle, and particularly in the shown case, too, it may be advantageous for the bar element 300 to be manufactured from a material that is suitable for reflecting microwave radiation. Thus, the radiation striking the bar element 300 can be reflected in the direction of the sample in the sample vessels 220, as result of which a higher thermal yield is achieved.

Furthermore, the bar element 300 comprises a magnetic stirring portion 330, by means of which it is possible to produce a magnetic field rotating relative to the sample holder 200 about the longitudinal axis LA. FIG. 3 elucidates how a rotating magnetic field is produced, for example by way of a relative rotation of the bar element 300 in relation to the sample holder 200 about the longitudinal axis LA (indicated by an arrow P). Here, the magnetic stirring portion 330 can be formed by a magnet with two magnetic poles N, S, which preferably extend radially opposite one another with respect to the longitudinal axis LA, as illustrated in FIGS. 1 to 3. Consequently, the magnet can be embodied as a bar magnet. By rotating the bar element 300 with respect to the sample holder 200, the magnetic stirring portion 330 can be preferably provided as a rotary magnet in order to produce the rotating magnetic field. In the illustrated exemplary embodiments, the magnetic stirring portion 330 extends axially below the sample holder 200, at least in part. However, further alternative or complementary configurations and hence arrangements of the magnetic stirring portion 330 are also conceivable, such as, for example, the at least partial radial extent of the magnetic stirring portion 330 within and/or outside of and/or axially above the sample holder 200.

As an alternative or, optionally, also in addition to the illustrated configuration of the magnetic stirring portion by way of a (bar) magnet, the magnetic stirring portion 330 can also be formed by an electric magnet. By way of example, the latter can be formed by a three-phase system with three coils that are geometrically displaced by 120° with respect to the longitudinal axis LA, phase-shifted currents being guided through said coils for the purposes of producing a rotating magnetic field. In such an embodiment of the bar element 300, a rotational movement of the bar element 300 would not be mandatory.

By means of the rotating magnetic field, which is produced in the manner described above or else in any other manner, it is possible, for example, to put stirring elements 270, which are provided in at least one of the sample vessels 220, into rotation P2. The stirring element 270 is preferably a magnetic stirrer bar; however, other configurations of the stirring element 270 are also conceivable. Thus, for example, a stirring element 270 could also be driven by virtue of exploiting a voltage induced by the magnetic field change.

Moreover, the bar element 300 can comprise a mechanical stirring portion which extends radially with respect to the longitudinal axis LA; i.e., it protrudes radially. In FIGS. 1 to 3, an advantageous embodiment of the mechanical stirring portion is shown, in which the mechanical stirring portion is formed by the magnetic stirring portion 330. As illustrated in FIG. 3, a stirring movement—for example, within a vessel 500 yet to be described below in this case—can be caused by the mechanical stirring portion 330 when the bar element 300 is rotated.

Further, the bar element 300 comprises a coupling portion 310. In particular, the coupling portion 310 serves for detachably coupling the bar element 300 to an operating unit 800. FIG. 1 shows an example of an embodiment of the coupling portion 330. The coupling portion 310 preferably has a coupling partner 810 of a mechanical and/or magnetic coupling of the operating unit 800. Here, the operating unit 800 can be embodied as a stator of an electric motor for driving the bar element 300 in rotational fashion. This is illustrated in an exemplary fashion in FIG. 3. However, the operating unit 800 can also be embodied as a circuit, for example, by means of which a power supply that is adapted to the windings of the magnetic portion 300 is provided. Here, a change in the poles can be brought about by clocking the direction of the current flow. The control and clock of the circuit can be provided by a control unit 1000, for example.

FIGS. 2 and 3 further show an optional development of the coupling portion 310. Here, the coupling portion 310 is connected to an attachment 311, which extends the coupling portion 310 along the longitudinal axis LA. The attachment 311 and the coupling portion 310 can be coupled to one another, for example by way of an interlocking and/or force-fit connection. Further, it is also conceivable for the attachment 311 to be embodied in integral fashion with the coupling portion 310. Depending on the chosen mode of operation and depending on the operating unit 800, the attachment 311 can have a current collector or magnet, for example, by means of which the bar element 300 is supplied with driving energy or driven. Mechanical coupling parts of a mechanical drive may also be provided.

The coupling portion 310, the fastening portion 320 and the magnetic stirring portion 330 are arranged along the longitudinal axis LA of the bar element 300, preferably in this sequence. Particularly preferably, the portions directly adjoin one another and, moreover, they are preferably embodied in integral fashion with one another. The exemplary arrangement of the three portions along the longitudinal axis LA is easily visible in FIGS. 1 to 3. In principle, a different sequence of the portions of the bar element 300 is also conceivable.

Further, the apparatus 100 can comprise a vessel 500 with a receiving space 530 for receiving the sample holder 200, preferably with sample vessels 220. The vessel 500 preferably comprises a coupling opening 520 for coupling microwaves into the receiving space 530. To this end, the system 700 may comprise a magnetron 910 or the like. Other heating apparatuses, such as, e.g., a heating rod, are also conceivable. The apparatus 100 may further comprise a lid 600 for sealing the receiving space 530. Particularly preferably, the lid 600 allows the vessel 500 to be sealed in pressure-tight fashion. The lid 600 may be provided with a special insulation layer 610 on the inner side. Such a vessel 500 and a lid 600 are illustrated in FIGS. 2 and 3 in exemplary fashion. It is further conceivable for the vessel 500 to have a pressure-resistant embodiment; in this case, said vessel may be embodied in such a way that it has a pressure-resistant outer sleeve 560. The vessel or the outer sleeve 560 thereof preferably consists of a pressure-resistant material, such as, e.g., stainless steel.

Preferably, the vessel 500 can have a lining 510 on its inner walls. The latter can be formed from PTFE, for example, in order to form the receiving space 530 of the vessel 500 in chemically inert fashion. The lining 510 can be provided in the form of a coating, for example. However, it is also conceivable for the lining 510 to be embodied in the form of an insert that is insertable into the vessel 500 in detachable fashion. Preferably, such a construction renders it possible to fill an additional loading liquid 550 into the container 500. The loading liquid 550 is preferably filled before the sample holder 200 and the bar element 300 are fastened into the receiving space 530, or after said fastening has been completed. The sample vessels 220 can protrude at least partly into the loading liquid 550. In the case where the mechanical stirring portion is provided on the bar element 300 in such a way that the latter reaches the loading liquid 550, the loading liquid 550 can be stirred in the case of a rotation P1 of the bar element 300 about the longitudinal axis LA. As a result, the receiving space 530 can be used as efficiently as possible and, should the large-area loading liquid 550 be heated, it is likewise possible to bring about uniform heating of the smaller sample vessels 220 by producing the driving force by the magnetic driving portion 330.

The sample holder 200 is preferably rotationally fixed with respect to the longitudinal axis LA. To this end, the apparatus 100 can comprise a blocking part 410, which interacts with a blocking region 400, in particular a blocking structure 240, of the sample holder 200 in such a way that the sample holder 200 is rotationally fixed with respect to the longitudinal axis LA. Particularly preferably, the vessel 500 is formed together, preferably in integral fashion, with the blocking part 410. Here, FIG. 2 shows, in exemplary fashion, a rotational fixation of the sample holder 200 by forming a press fit 440 between the inner side 511, which is embodied at least partially as a blocking part 410, of the container 500—in this case, the receiving receptacle 510 thereof—and the outer side 240 of the sample holder 200 that is embodied as blocking region 400. Here, a frictional force is produced by the contact pressure between the two surfaces 240, 511, said frictional force causing the sample holder 200 to be rotationally fixed with respect to the longitudinal axis LA by way of a force-fit connection. Preferably, the surfaces 240, 511 can have a corresponding structure in order to provide an interlocking connection with respect to a circumferential direction about the longitudinal axis LA as an alternative or in addition to a force-fit connection. As an alternative, it is also conceivable, for example, for the sample holder 200 to be embodied in such a way that it rotates with respect to the longitudinal axis LA with a different speed than the rotating magnetic field, and preferably more slowly than the latter.

A further exemplary configuration of the blocking part 410 emerges from the description of the system 700 according to the invention with the aid of FIG. 3.

Here, the system 700 comprises an operating unit 800 and an apparatus 100, which is detachably coupled to the operating unit 800 via the coupling portion 310. Moreover, the system 700 may comprise a thermal sensor 420 for capturing the temperature in the sample vessels 220 or in the vessel 500. As shown in FIG. 3, the thermal sensor 420 may have a rod-shaped embodiment. The thermal sensor 420 preferably protrudes into the vessel 500 and it may be connected to the lid 600. Here, the blocking part 410 can be formed by means of the thermal sensor 410. Here, as seen in the circumferential direction about the longitudinal axis LA, the thermal sensor 410 forms an interlocking connection with a recess 260 of the sample carrier 200 forming the blocking region 400. The recess 260 of the sample carrier 200 forming the blocking region 400 is also illustrated in FIG. 1.

The lid 600 can be embodied together with the operating unit 800 such that lid 600 and operating unit 800 can preferably be moved as one assembly. Further, the system 700 may comprise a drive unit 900, by means of which the lid 600 is movable relative to the vessel 500 in partly or fully automated fashion in order to selectively open the vessel 500 or seal the latter with the lid 600.

Further, the system can comprise a control unit 1000, which controls the operating unit 800 and further, preferably controls the drive unit 900 and the heating apparatus 910. Here, the control unit 1000 can preferably facilitate fully or partly automated control. To this end, the control unit 1000 preferably can be connected to the thermal sensor 420 in order to facilitate a temperature-dependent control.

A process for stirring samples in sample vessels, in particular samples for laboratory operations, is described below.

In a first step, a system 700 of the above-described type is provided. By way of example, this step may contain detachably connecting the bar element 300 to the sample vessel 200 by means of the connecting portion 320. Further, the bar element 300 can be detachably coupled via its coupling portion 310 to the operating unit 800.

In a second step, at least one sample vessel 220 comprising a sample is inserted into the sample holder 200, wherein a stirring element 270 is arranged in at least one of the sample vessels 220.

Now, the apparatus 100 can be detachably coupled to the operating unit 800 by means of the coupling portion 310 of the bar element 300. If the operating unit 800 is formed together with the lid 600 in this case, the apparatus 100 can be coupled directly to the lid 600, for example by way of attractive magnetic forces. Further, a centration in the lid 600 can be achieved in the process by means of the attachment 311. If, moreover, a drive unit 900 is provided in the system 100, the lid 600 can be automatically driven onto the vessel 500 in order to seal the latter, preferably in pressure-tight fashion, while the sample holder 200 is received in the receiving space 530 at the same time. Moreover, loading liquid 550 could have been filled into the vessel 500, for example in advance.

Now, a magnetic field rotating relative to the sample holder 200 about the longitudinal axis LA is produced according to the invention by means of the magnetic stirring portion 330 in order to put the stirring elements 270 in the sample vessels 220 into rotation P2. Here, the rotating magnetic field can be produced by an electric magnet. As an alternative or in addition thereto, it is also conceivable for the bar element 300 to be rotated relative to the sample holder 200 about the longitudinal axis LA while, preferably, the sample holder 200 is rotationally fixed with respect to the longitudinal axis LA by means of the blocking region 400. If the magnetic stirring portion has a (bar) magnet, the rotating magnetic field is produced by this rotation P1. If a loading liquid 550 has been filled into the vessel 500, the sample vessels 220 at least partly protruding into said loading liquid, a mechanical stirring portion—formed by the magnetic stirring portion 330, for example—is preferably provided, said mechanical stirring portion being arranged in the loading liquid 550 in such a way that the loading liquid 550 is stirred in the case of a rotation P1 of the bar element 300 about the longitudinal axis LA.

By means of an optionally provided heating apparatus, there can be heating of the sample or in the sample vessels 220 or in the vessel 500 (consequently, for example, of the loading liquid 550, too) before, after and/or during the stirring procedure.

After completing the desired process while stirring, it is possible for the lid 600 to be removed from the vessel 500 again, for example by means of the drive unit 900. Here, the apparatus 100 can be removed from the coupling partner 810 by way of pulling off the bar element 300.

The method can be carried out in partly or fully automatic fashion. To this end, use can be made of the control unit 1000.

Further process steps emerge accordingly from the description of the apparatus 100 and of the system 700.

The present invention is not restricted by the exemplary embodiments described above, provided it is comprised by the subject matter of the following claims. In particular, all features of the exemplary embodiments are combinable and interchangeable between one another and among themselves as desired.

The invention claimed is:

1. Apparatus (100) for producing a driving force for stirring, the said apparatus (100) comprising
a sample holder (200) for receiving at least one sample vessel (220) for samples and
a bar element (300), which extends along a longitudinal axis (LA) and which is connected to the sample holder (200),
wherein the bar element (300) comprises:
a coupling portion (310) for detachably coupling the bar element (300) to an operating unit (800),
a fastening portion (320), wherein the sample holder (200) is connected to the bar element (300) by means of the fastening portion (320) fastening the sample holder (200) to the bar element (300) and positioning the sample holder (200) along the longitudinal axis (LA) in defined fashion, and
a magnetic stirring portion (330),
wherein the bar element (300) is configured such that a magnetic field that rotates relative to the sample holder (200) about the longitudinal axis (LA) can be produced by means of the magnetic stirring portion (330), and
wherein the sample holder (200) comprises a body with a body axis and openings (210) for receiving the sample vessels (220) in an upright position, wherein the openings (210) are arranged distributed about the body axis, and
wherein the sample holder (200) is connected to the bar element (300) in a coaxial fashion so that the openings (210) are arranged distributed about the longitudinal axis (LA).

2. Apparatus (100) according to claim 1, wherein the sample holder (200) has a point-symmetric or cyclically symmetric configuration as seen in the direction of the longitudinal axis (LA).

3. Apparatus (100) according to claim 1, wherein the sample holder (200) is detachably connected to the bar element (300).

4. Apparatus (100) according to claim 1, wherein the magnetic stirring portion (330) is formed by an electric magnet, and/or wherein the magnetic stirring portion (330) is formed by a bar magnet with two magnetic poles, wherein the magnetic poles extend radially opposite one another with respect to the longitudinal axis (LA).

5. Apparatus (100) according to claim 1, wherein the fastening portion (320) is configured such that the bar element (300) is mounted to be rotatable relative to the sample holder (200) about the longitudinal axis (LA), wherein the magnetic stirring portion (330) is provided as a rotary magnet to produce the rotating magnetic field by way of rotating the bar element (300) with respect to the sample holder (200).

6. Apparatus (100) according to claim 1, wherein the fastening portion (320) is formed by a stepped portion (321) of the bar element (300), wherein the sample holder (200) lies in axial fashion on a radial step of the stepped portion (321) and the sample holder (200) is mounted in rotatable fashion.

7. Apparatus (100) according to claim 1, wherein the bar element (300) has a mechanical stirring portion, which extends radially with respect to the longitudinal axis (LA), wherein the mechanical stirring portion is formed by the magnetic stirring portion (330).

8. Apparatus (100) according to claim 1, wherein the magnetic stirring portion (330) extends at least partly radially within or outside of the sample holder (200) or at least partly axially below the latter.

9. Apparatus (100) according to claim 1, wherein the sample holder (200) is rotationally fixed with respect to the longitudinal axis (LA), or the sample holder (200) is configured such that it rotates with respect to the longitudinal axis (LA) at a different speed to the rotating magnetic field.

10. Apparatus (100) according to claim 9, further comprising a blocking part (410), which interacts with a blocking region (400) or a blocking structure (240), of the sample holder (200) so as to rotationally fix the sample holder (200) with respect to the longitudinal axis (LA).

11. Apparatus (100) according to claim 1, further comprising a vessel (500) with a receiving space (530) for receiving the sample holder (200).

12. Apparatus (100) according to claim 11, further comprising a lid (600) for sealing the receiving space (530) in pressure-tight fashion.

13. Apparatus (100) according to claim 11, wherein the vessel (500) has a coupling opening (520) for coupling microwaves into the receiving space (530).

14. Apparatus (100) according to claim 1, further comprising at least one sample vessel (220), wherein a stirring element (270) is arranged in the at least one sample vessel (220), the stirring element (270) being able to be put into rotation (P2) by means of the rotating magnetic field of the magnetic stirring portion (330).

15. Apparatus (100) according to claim 1, wherein the coupling portion (310) has a coupling partner (810) of a mechanical and/or magnetic coupling of the operating unit (800).

16. Apparatus (100) according to claim 1, wherein the coupling portion (310), the fastening portion (320) and the magnetic stirring portion (330) are arranged in this sequence along the longitudinal axis (LA) of the bar element (300), and have an integral configuration with one another.

17. System (700), comprising:
the operating unit (800) and
an apparatus (100) according to claim 1, wherein the apparatus (100) is detachably coupled to the operating unit (800) via the coupling portion (310).

18. System (700) according to claim 17, further comprising a thermal sensor (420) for capturing the temperature in the sample vessels (220), wherein a blocking part (410) is formed by the thermal sensor (420), which, when viewed in the circumferential direction about the longitudinal axis (LA), forms an interlocking connection with a recess (260) of the sample holder (200).

19. System (700) according to claim 17, wherein the apparatus (100) further comprises a vessel (500) with a receiving space (530) for receiving the sample holder (200), and a lid (600) for sealing the receiving space (530) in pressure-tight fashion, wherein the lid (600) is formed together with the operating unit (800).

20. System (700) according to claim 19, further comprising a drive unit (900) by means of which the lid (600) is movable relative to the vessel (500) in partly or fully automated fashion in order to selectively open the vessel (500) or seal the latter with the lid (600).

21. System (700) according to claim 17, further comprising a heating apparatus (910) for heating a sample.

22. System (700) according to claim 17, further comprising a control unit (1000) for controlling the operating unit (800).

23. Process for stirring samples for laboratory operations in sample vessels (200) the process including the following steps:
   providing a system (700) according to claim 17,
   inserting at least one sample vessel (220) comprising a sample into the sample holder (200), wherein a stirring element (270) is arranged in at least one of the sample vessels (220),
   producing a magnetic field rotating relative to the sample holder (200) about the longitudinal axis (LA) by means of the magnetic stirring portion (330) in order to put the stirring elements (270) in the sample vessels (220) into rotation (P2).

24. Process according to claim 23, wherein the apparatus (100), is received in a receiving space (530) of a vessel (500) before the rotating magnetic field is produced, wherein, further, the receiving space (530) is sealed by means of a lid (600), in pressure-tight fashion.

25. Process according to claim 23, wherein the bar element (300) is rotated relative to the sample holder (200) about the longitudinal axis (LA) while the sample holder (200) is rotationally fixed with respect to the longitudinal axis (LA) by means of a blocking region (400).

26. Process according to claim 25, wherein, further, a loading liquid (550) is filled into a vessel (500), the sample vessels (220) at least partly protruding into the loading liquid (550), wherein a mechanical stirring portion of the bar element (300), which extends radially with respect to the longitudinal axis (LA), is arranged in the loading liquid (550) such that the loading liquid (550) is stirred in the case of a rotation (P1) of the bar element (300) about the longitudinal axis (LA).

27. Apparatus (100) for producing a driving force for stirring samples, the apparatus (100) comprising
   a sample holder (200) for receiving at least one sample vessel (220) for samples and
   a bar element (300), which extends along a longitudinal axis (LA) and which is connected to the sample holder (200),
   wherein the bar element (300) comprises:
      a coupling portion (310) for detachably coupling the bar element (300) to an operating unit (800),
      a fastening portion (320), wherein the sample holder (200) is connected to the bar element (300) by means of the fastening portion (320) fastening the sample holder (200) to the bar element (300) and positioning the sample holder (200) along the longitudinal axis (LA) in defined position, and
      a magnetic stirring portion (330),
   wherein the bar element (300) is configured such that a magnetic field that rotates relative to the sample holder (200) about the longitudinal axis (LA) can be produced by means of the magnetic stirring portion (330), and
   wherein the bar element (300) extends along the longitudinal axis (LA) between two opposite ends, the coupling portion (310) being on one end, the magnetic stirring portion (330) being on the other end and the fastening portion (320) being provided therebetween.

* * * * *